United States Patent [19]

Fujiie et al.

[11] Patent Number: 4,858,217

[45] Date of Patent: Aug. 15, 1989

[54] OPTICAL DISK RECORDING AND REPRODUCING DEVICE

[75] Inventors: Kazuhiko Fujiie, Tokyo; Tadao Yoshida, Kanagawa; Ryo Ando, Tokyo, all of Japan

[73] Assignee: Sony Corporation, Tokyo, Japan

[21] Appl. No.: 121,141

[22] Filed: Nov. 16, 1987

[30] Foreign Application Priority Data

Nov. 18, 1986 [JP] Japan .................................. 61-272860

[51] Int. Cl.⁴ ......................... H04N 5/76; G11B 5/09
[52] U.S. Cl. ......................................... 369/59; 360/40
[58] Field of Search ...................... 369/59; 360/32, 40; 371/39, 45

[56] References Cited

U.S. PATENT DOCUMENTS

4,731,774  3/1988  Furokawa .............................. 369/59
4,748,611  5/1988  Tsuyoshi et al. ...................... 369/59

Primary Examiner—Vincent P. Canney
Attorney, Agent, or Firm—Hill, Van Santen, Steadman & Simpson

[57] ABSTRACT

An optical disk recording/reproducing device that records and reproduces digital audio data by executing an interleave processing for error correction is disclosed. According to the invention, when new musical information is recorded successively after previously recorded musical information, recording is started by digitally adding zero data for a prescribed period. Similarly, upon stopping recording of the musical information, zero data are digitally added for a prescribed period so as to end recording. The present invention is made to produce no abnormal sounds in a boundary section of one musical information in its reproduction state and the other musical information that comes immediately before or after it.

6 Claims, 9 Drawing Sheets

OPTICAL DISK RECORDING AND REPRODUCING DEVICE

BACKGROUND OF THE INVENTION

1. Field of the Invention

This invention relates to an optical disk recording and reproducing device adopting an interleave processing executed on digital signals for error correction and, more particularly, to a recording and reproducing device for musical information that is digital and uses an optical disk as a record medium.

2. Description of the Prior Art

Compact Disc or CD techniques wherein musical information is converted into digital signals to be recorded thereon has been utilized as a music source with high quality, and recording/reproducing devices for the CD techniques have also been evolved for practical use.

Meanwhile, an optical disk recording/reproducing device, that differs from the CD, wherein a recording format with compatibility is adopted and digital audio data are recorded and reproduced using a recordable type optical disk as a record medium is disclosed for example in our preceding PCT application (Appln. No. PCT/JP87/00764).

Figure 1:
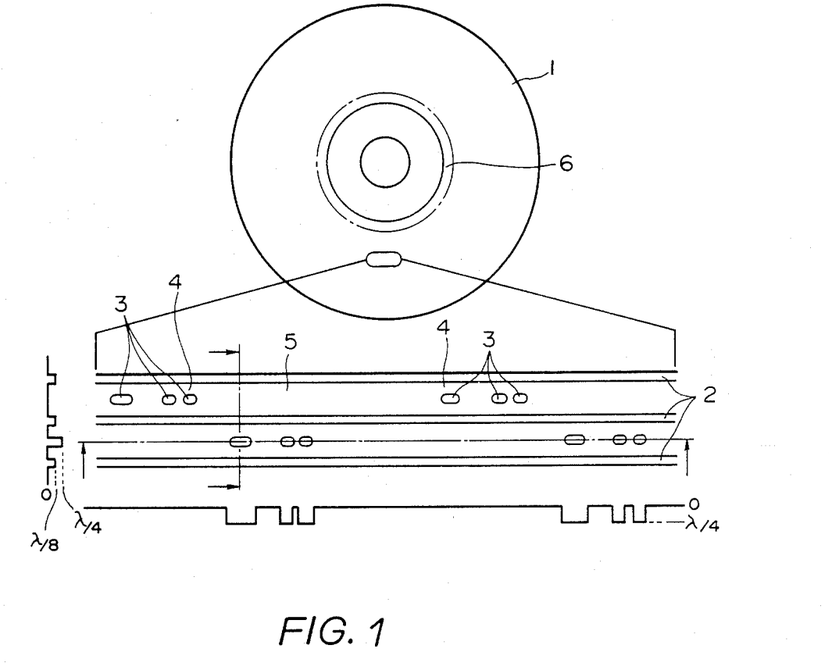
FIG. 1 is a plan view with certain parts enlarged to schematically show a record surface of a recordable type optical disk.

In the optical disk recording/reproducing device, as shown in FIG. 1, an opto-magnetic disk 1 wherein a vertical magnetizing membrane with a magneto-optical effect is provided on a disk recording surface that is 12 cm in diameter is used as a record medium. There are tracks in the opto-magnetic disk 1 spirally formed by the respective pre-groups 2 each one of which is $\lambda/8$ in depth (in which $\lambda$ indicates a wavelength of a laser beam). In each land section placed between the pre-groups 2, a pre-recorded area 4 on which pits 3 or frame signals are recorded in the circumferential direction presenting uneven shapes at regular intervals. In the center part of the pre-recorded area 4 there is a data record area 5 where the opto-magnetic recording is performed.

Also, in a lead-in section of the inside circumference of the opto-magnetic disk 1, there is provided an area called TOC (table of contents) section 6 on which various data indicating the recorded information of the disk, for example, numbers of musical pieces, starting and ending times, can be recorded.

The distance from the pit 3 provided in the prerecorded area 4 to the pit 3 provided in the next prerecorded area 4 corresponds to one frame, wherein 588-channel-bit data, being in conformity with a CD standard, can be accommodated.

In the CD standard, EFM modulation (Eight to Fourteen Modulation) is adopted. That is, one frame consists of 588 channel bits, with the first 24 bits being allotted to frame synchronous signals, while the remaining 14×32 bits (32 symbols) are allotted to the musical information data and parity bits. Thus an error correction code called CIRC (Cross Interleave Reed-Solomon Code) supplying the interleave delay which corresponds to maximum 108 frames is performed.

The CIRC error correction is executed, in addition to adopting EFM modulation, in such type of optical disk recording/reproducing device using the recordable optomagnetic disk 1, in order to enable reproduction of a usual CD and to attain upper compatitility.

Though the detailed explanation is abridged, the conventional CIRC error correction adopted for CD is executed by two-series Reed-Solomon Code that includes $C_1$ error correction, for correcting a one word symbol code, and $C_2$ error correction, capable of correcting data scattered within the plural frames, due to interleaving. By this code, in case erroneous data is found in the recorded data of an optical disk upon reading, the error can be corrected by referring to the data placed in 108 frames before and behind the erroneous data.

Figure 2:
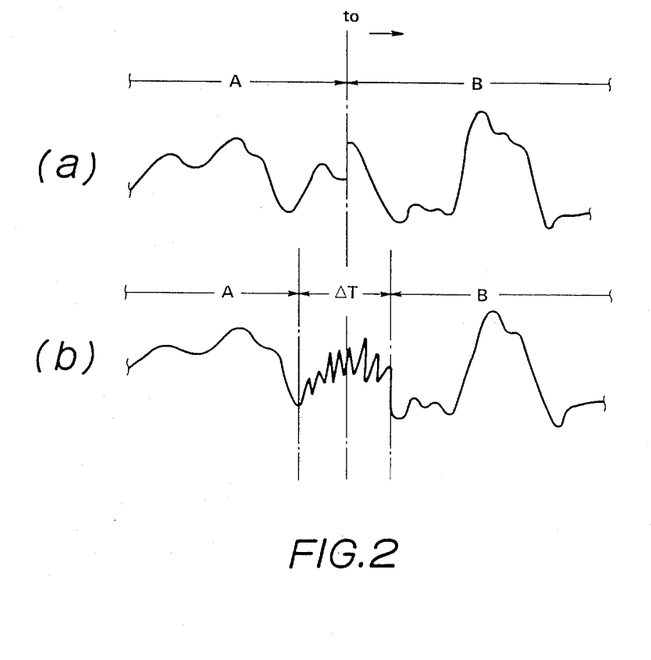
FIG. 2 consisting of A and B is an analog wave form chart of recorded and reproduced musical information explaining an abnormal sound caused when musical information is successively recorded on a recordable type optical disk.

With reference to FIG. 2(a), illustrating an analog waveform of the recorded musical information, new musical information B is written from the time $t_0$ into the prerecorded musical information part A for example. When these recorded information are reproduced, as seen from FIG. 2(b) illustrating an analog waveform of the reproduced musical information, an abnormal sound (consisting of noise and sometimes referred to as buchi-buchi sound) originates during the period $\Delta T$ that includes several frames before and after the time $t_0$.

This abnormal sound is caused by the above-mentioned $C_2$ error correction. That is, since the interleave relevancy is lost in said period $\Delta T$, the wrong correcting procedure is performed to cause the abnormal sounds as though the musical information A and B are alternately outputted per one sample.

OBJECT AND SUMMARY OF THE INVENTION

It is an object of the present invention to provide an optical disk recording/reproducing device that can record digital audio data to which an interleave processing for error correction has been executed on the optical disk and that produces no abnormal sounds at a boundary section of the audio data during reproduction.

It is another object of the present invention to provide an optical disk recording/reproducing device that performs an interleave processing for error correction by adding zero data to a leading part of digital audio data for the prescribed period, and that records the digital audio data on the optical disk together with said zero data.

It is a still another object of the present invention to provide an optical disk recording/reproducing device that performs an interleave processing for error correction by adding zero data to an ending part of digital audio data for the prescribed period, and that records the digital audio data on the optical disk together with said zero data.

A futher object of the present invention to provide an optical disk recording/reproducing device that performs an interleave processing for error correction by adding zero data to a leading part and an ending part of digital audio data for the prescribed period, and that records the digital audio data on the optical disk together with said zero data.

A still further object of the present invention is to provide an optical disk recording/reproducing device that performs an interleave processing for error correction after replacing a leading part and/or ending part of digital audio data with zero data by encoding means for the prescribed period corresponding to the interleave length in the interleave processing by means of data processing, and that records the digital audio data on the optical disk together with said zero data.

Another object of the present invention is to provide an optical disk recording/reproducing device that performs an interleave processing for error correction by adding zero data for the prescribed period to a leading part and/or an ending part of digital audio data to which fade-in/fade-out processing has been executed, and that records the digital audio data to the optical disk together with said zero data.

Other object and advantage of the invention will be apparent in the following description, the appending claims and the accompanying drawings.

DESCRIPTION OF THE PREFERRED EMBODIMENT

Figure 3:
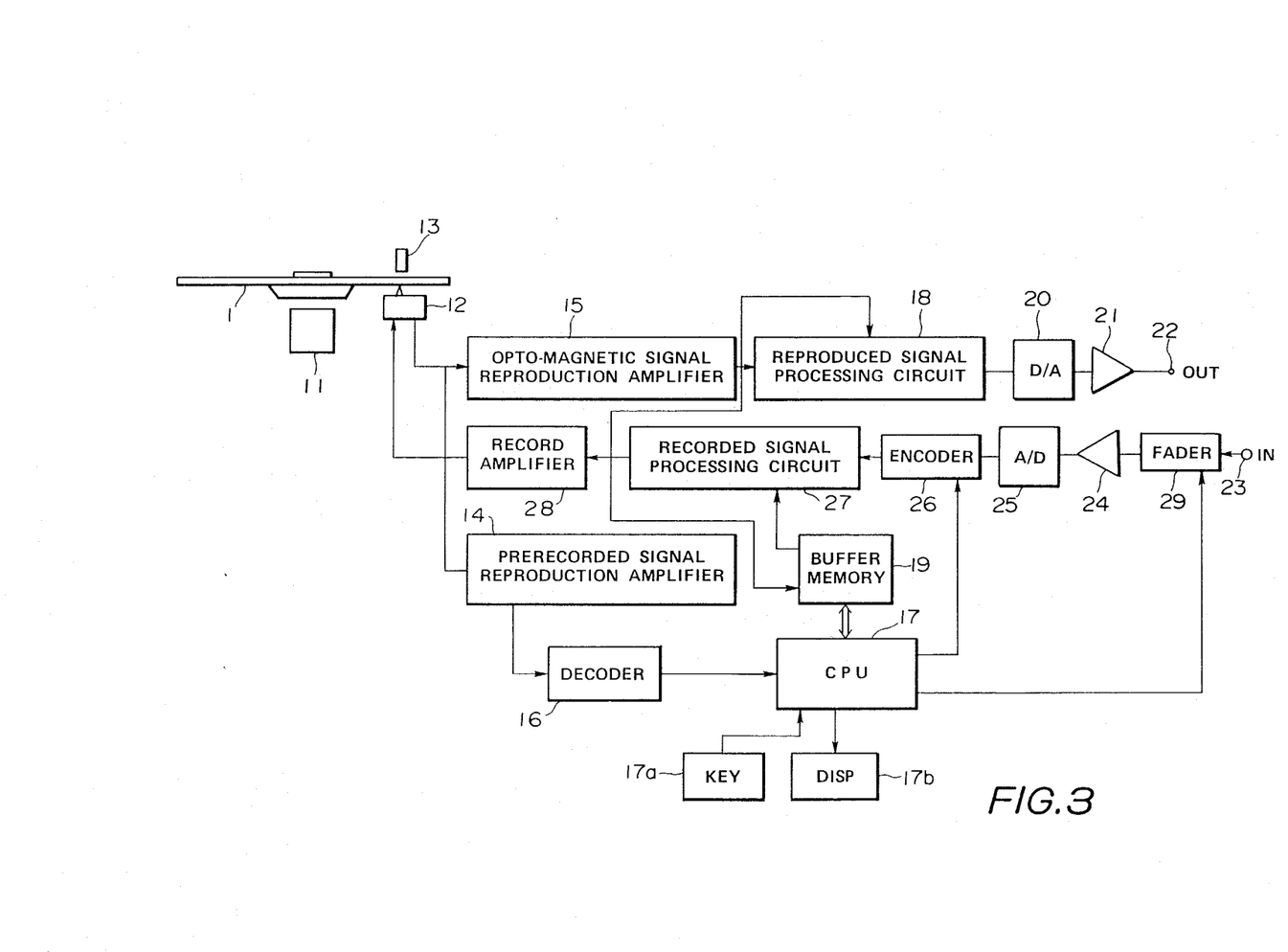
FIG. 3 is a block diagram showing an embodiment of an optical disk recording/reproducing device of the present invention.

FIG. 3 illustrates a structure of an optical disk recording/reproducing device in accordance with an embodiment of the present invention. Referring to FIG. 3, an optomagnetic disk 1 shown in FIG. 1 is used as a recordable type optical disk. The opto-magnetic disk 1 is rotated at a constant linear velocity by a motor 11.

An optical head 12 consists of several optical parts such as a laser diode, a plotodetector, a lens and a half mirror, and is controlled so that it performs writing and reading of digital audio data by irradiating a laser beam.

Also, a magnet 13 for applying the external magnetic field is provided on the opposite side of the optical head 12, with the opto-magnetic disk 1 placed between them. The magnet 13 is controlled such that its polarity reverses at the time of erasure and recording.

Among RF signals (high frequency signals) read from the opto-magnetic disk 1 by the optical head 12, signals corresponding to a pre-recorded area 4 of the opto-magnetic disk 1 are supplied to a pre-recorded signal reproducing amplifier 14, whereas signals corresponding to a TOC section 6 and a data record area 5 where the opto-magnetic recording is performed are transmitted to an opto-magnetic signal reproduction amplifier 15.

From the pre-recorded signal reproduction amplifier 14, absolute time information (an address signal) is inputted to a microcomputer (CPU) 17 through a decoder 16. Also, an output from the opto-magnetic reproduction amplifier 15 is transmitted to a reproduced signal processing circuit 18, where de-interleave processing and other signal processing are executed thereon. Disk information recorded in the TOC section 6 is supplied to a buffer memory 19 from the reproduced signal processing circuit 18. Then, digital audio data recorded in the data record area 5 are transmitted to a digital to analog (D/A) converter 20 from the reproduced signal processing circuit 18 to be converted into analog signals, and outputted as reproduced audio signals from a terminal 22 through an output amplifier 21.

On the other hand, at the time of recording, an analog audio signal that is to be recorded is supplied to a terminal 23. This analog audio signal is transmitted from a fader 29 through an input amplifier 24 to an analog to digital (A/D) converter 25 to be converted into digital data. The digital audio data obtained at the analog-digital converter 25 are transmitted to a recorded signal processing circuit 27 through an encoder 26 that adds zero data, where the prescribed signal processing, such as data blocking, interleave processing, and addition of error correcting code is executed. The digital audio data to which prescribed signal processing is executed in the recorded signal processing circuit 27 are then transmitted to the optical head 12 through a record amplifier 28. After modulating the laser diode, these data are recorded in the data record area 5 of the prescribed track of the opto-magnetic disk 1.

Following procedure is also possible. First supply the output data of said analog to digital converter (A/D) 25 to the computer 17, detecting silent parts between tunes and writing them with their tune numbers or ending time, etc. to the buffer memory 19 as disk information. Then, read this information from the buffer memory 19 to have it recorded in the TOC section 6 of the opto-magnetic disk 1 just before removing the disk 1 from the optical disk recording/reproducing device of the present embodiment.

In FIG. 3, 17a indicates an input device for designating operation modes of the device and recording/reproducing position of the musical information. The input device 17a also includes a record key, a reproduction key, and a stop key, etc. 17b is a display device indicating recording/reproducing situation of the opto-magnetic disk 1.

The optical disk recording/reproducing device of the present embodiment with the aforementioned structure performs a recording operation in a following manner.

When giving an order to start recording the musical information to the computer 17 by operating the record key of the input device 17a, the computer 17 first controls the encoder 26 such that it outputs zero data only for 108-frame period that corresponds to one interleave length of the interleave processing at the recorded signal processing circuit 27. Thus, zero data equivalent to one interleave length are added to a leading part of digital audio data of audio signals incoming from the terminal 23. To this musical information, prescribed signal processing, such as an interleave processing, is executed at the recorded signal processing circuit 27 so that zero data equivalent to one interleave length are added to the leading part in the encoder 26 due to the control of the computer 17. By modulating the laser power of the optical head 12 with the digital data, after the prescribed signal processing executed to them in the recorded signal processing circuit 27, these digital audio data to which zero data of one interleave length are added are recorded on the opto-magnetic disk 1.

Also, when giving an order to stop recording musical information to the computer 17 by operating the stop key of the input device 17a, the computer 17 controls the encoder 26 such that it outputs zero data only for a 108-frame period that is equivalent to one interleave length, and adds zero data equivalent to one interleave length to an ending part of the digital audio data that have been recorded on the optomagnetic disk 1 by that time. Then, after executing the prescribed signal processing such as interleaving processing to the zero data with one interleave length added to the ending part of the digital audio data, and after recording them on the opto-magnetic disk 1, the computer 17 releases the recording mode.

Figure 4:
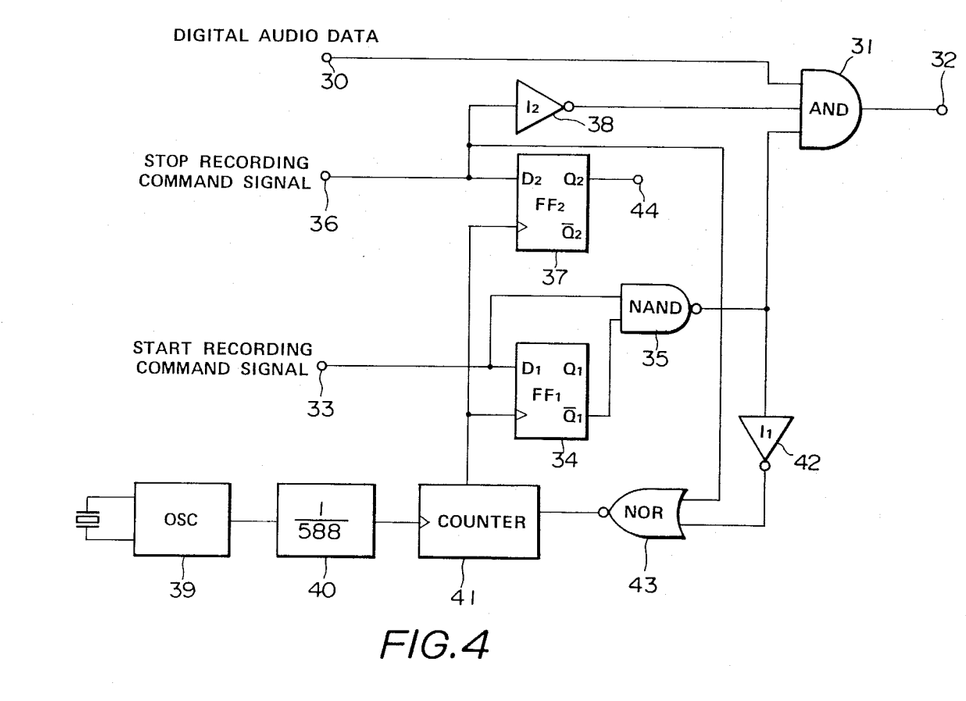
FIG. 4 is a block diagram showing a construction of an encoder that constitutes the embodiment of FIG. 3.

The encoder 26 that adds zero data to the leading part and the ending part of the digital audio data by the control of said computer 17 can be embodied as a construction given in FIG. 4, as an example.

Referring to FIG. 4, to one data input terminal 30, there are supplied digital audio data obtained at the analog to digital converter (A/D) 25. These digital audio data are outputted from an output terminal 32 through an AND gate 31. Also, to a first control input terminal 33, there is supplied a command signal to start recording from the computer 17 by operating the record key in the input device 17a. This command signal is supplied to a data input terminal of a first D type flip-flop (FF$_1$) 34 and to an NAND gate 35. Further, to a second control input terminal 36, a command signal to end recording is supplied from the computer 17 by operating the end key of the input device 17a. This command signal is supplied to a data input terminal of a second D type flip flop (FF$_2$) 37 and to an NOR gate 43 as well as it is supplied to the AND gate 31 as a gate control signal through an inverter (I$_2$) 38.

In the encoder 26, a quartz oscillating circuit 39 oscillates at 4.3218 MHz that is equivalent to a carrier frequency of EFM modulation in the CD standards, and supplies a frequency divider 40 with a bit clock obtained as its oscillated output. The frequency divider 40 forms a frame pulse, i.e., a frame-period pulse per 588 channel bits by multiplying the bit clock by 1/588, and supplies the frame pulse to a counter 41. The start recording command signal is supplied to a clear input terminal through the NAND gate 35, inverter (I$_1$) 42, NOR gate 43, clearing the counter 41 at time t$_1$ (FIG. 5) the rising edge of the start recording command signal. Also, the stop recording command signal is supplied to the clear input terminal through the NOR gate 43, clearing the counter 41 at time t$_2$ at the rising edge of the stop recording command signal. As shown in the timing chart of FIG. 5, the counter 41 supplies the respective clock input terminals of said first and second D type flip-flop 34, 37 with one output pulse every time it counts 108-frame pulses that are supplied from the frequency divider 40.

Figure 5:
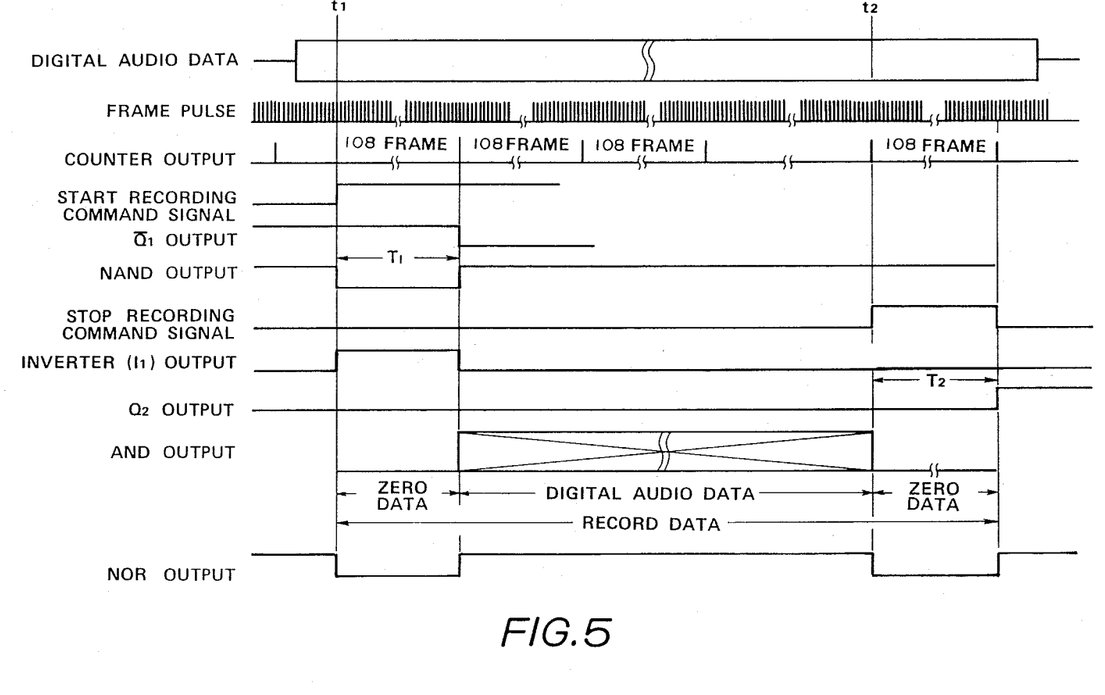
FIG. 5 is a time chart explaining an operation of the encoder.

The start recording command signal that is supplied to the data input terminal of the first D type flip-flop 34 is delayed one period (108-frame period), i.e., a period corresponding to one interleave length, of the calculated output pulse of the counter 41 and becomes a negative output $\overline{Q_1}$. The D type flip-flop 34 supplies the NAND gate 35 with the negative output $\overline{Q_1}$. As shown in FIG. 5, the NAND gate 35 forms a gate control signal that becomes logically "0" for a period T$_1$ that corresponds to one interleave length from the time t$_1$ at the rising edge of the start recording command signal but that becomes logically "1" during other periods.

The NAND gate 35 supplies said gate control signal as an NAND output, derived from of the start recording command signal and said negative output $\overline{Q_1}$ to the AND gate 31.

Similarly, the stop recording command signal that is supplied to the data input temrinal of the second D type flip-flop 37 is delayed one period of the calculated output pulse of the counter 41 (108-frame period), i.e., a period T$_2$ corresponding one interleave length, and becomes an affirmative output Q$_2$. The second D type flip-flop 37 outputs the affirmative output Q$_2$ from its control output terminal 44 as an actual stop recording command signal.

As seen in FIG. 5, when digital audio data are supplied through the data input terminal 30, the AND gate 31 adds zero data to a leading part of these data for the period T$_1$ that is equivalent to one interleave length by the gate control signal supplied from the NAND gate 35. Also, the AND gate 31 adds zero data to an ending part of said digital audio data for the period T$_2$ that is equivalent to one interleave length by the gate control signal supplied from the inverter 38.

Figure 6:
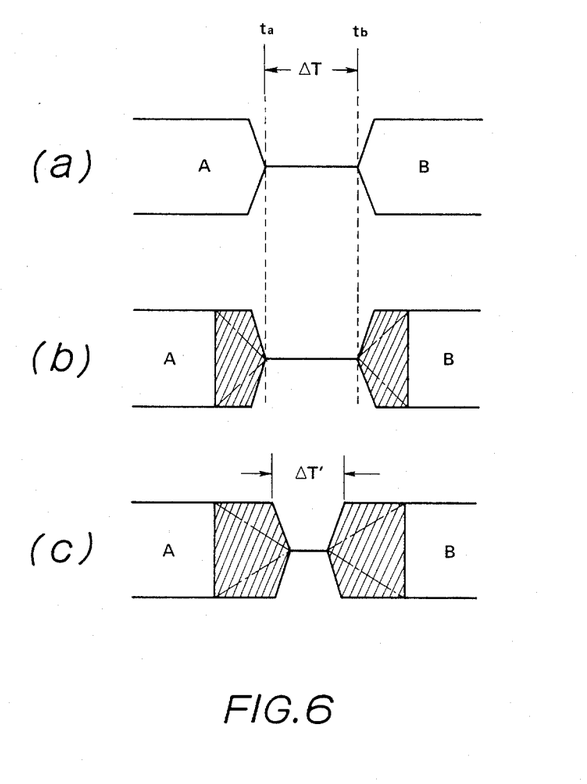
FIG. 6 consisting of A through C is a wave form chart showing a data wave form example of a successively recorded part when musical information is successively recorded using the optical disk recording/reproducing device of the present invention.

In the optical disk recording/reproducing device having the encoder 26 of the above-mentioned structure, in case musical information B, a source of which is connected to the terminal 23, is recorded directly following the previously recorded musical information A on the opto-magnetic disk 1, zero data are to be recorded for a period ΔT to the boundary part of both musical informations as shown in FIG. 6(a). As the period ΔT is equivalent to 216-frame period, that is, two interleave lengths of the interleave processing for C$_2$ error correction, interleave processing is performed neither on data immediately before the ending point (ta) of the musical information A nor data just after the starting point (tb) of the musical information B. Accordingly, even if a signal processing such as de-interleave processing is executed at the time of reproduction, data immediately before the ending point (ta) of the musical information A is not corrected by mistake by data of the musical information B, and data just after the starting point (tb) of the musical information B is not corrected by mistake by data of the musical information A, either.

Thus, with the optical disk recording/reproducing device, it is possible to record plural musical informations successively on the opto-magnetic disk 1 in a record pattern free of abnormal sounds (buchi-buchi sounds) at the boundary sections of each musical information. It is also possible to reproduce musical information without producing abnormal sounds from the opto-magnetic disk 1.

It is to be noted that during the period ΔT when said zero data are being recorded, no sounds are produced. Yet as the period ΔT lasts only for about several 10 ms, there is no auditory problem.

As shown in FIG. 6(b), it is auditorily effective to execute fade-out or fade-in control on the shaded portions before and after the recording period ΔT of said zero data around which musical information A and B are successively recorded in order to connect those musical information smoothly, without interrupting them abruptly.

Such fade-out or fade-in control may be executed by digital processing at the encoder 26, however, as shown in the embodiment of FIG. 1, it is simplest to execute it at an analog fader 29 that is provided between the terminal 23 to which analog audio signals are inputted and the input amplifier 24.

Besides, when the analog fader 29 is used, generation of the abnormal sounds can be reduced to the value that is too small for the listener to recognize them auditorily even if the zero data recording period ΔT is shorter than the period equivalent to the interleave length for error correction, as shown in FIG. 6(c). This also serves to reduce the silent period during the successive recording.

Figure 7:
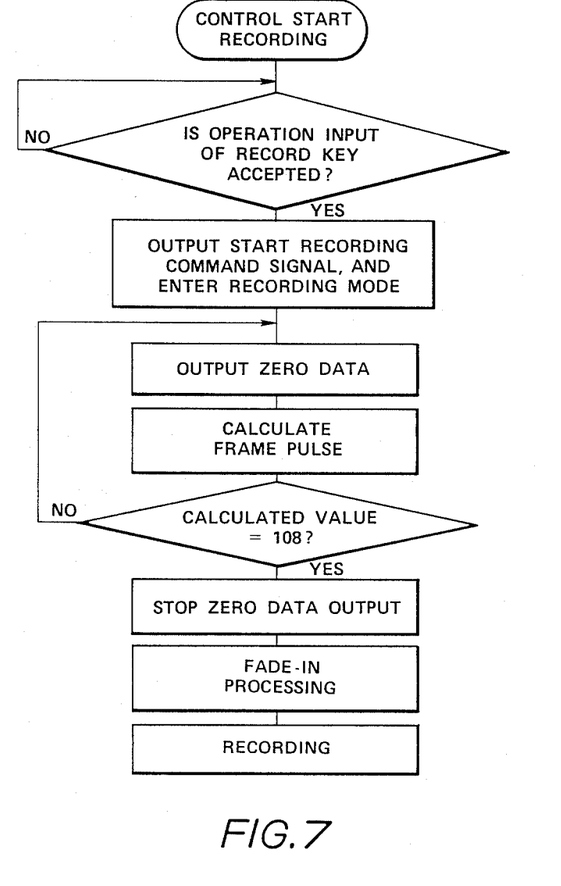
FIG. 7 is a flow chart showing a control operation to start recording by CPU that constitutes the embodiment of FIG. 3.
Figure 8:
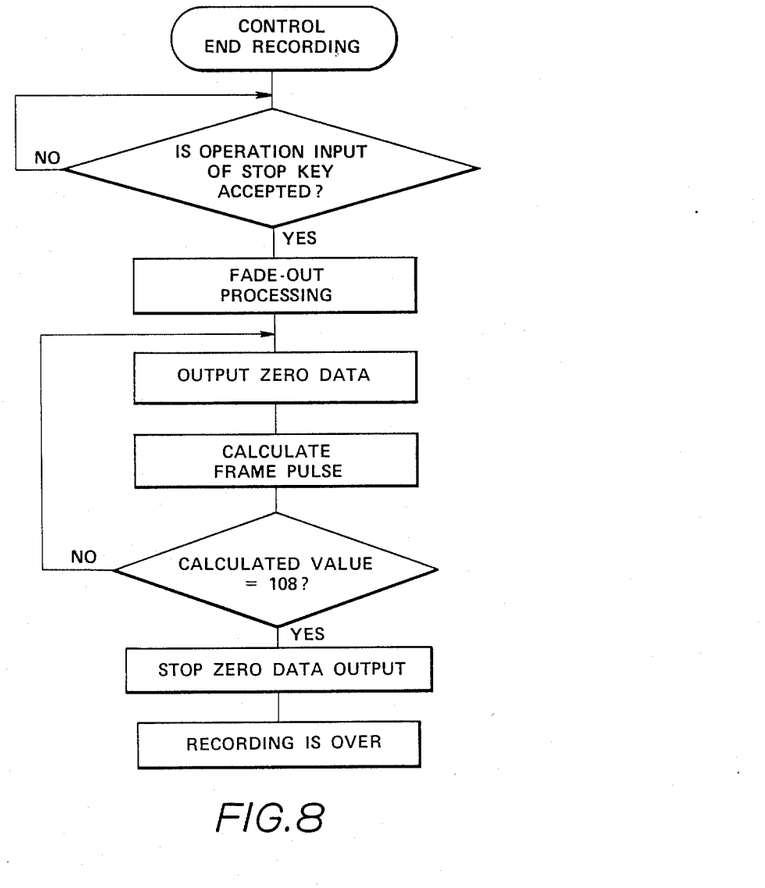
FIG. 8 is a flow chart showing a control operation to stop recording by said CPU.

With reference to flow charts of FIGS. 7 and 8, procedures of the control operation at the time of start and end recording, including the above-mentioned fade-out, fade-in control are explained, respectively.

At the time of start recording, as shown in FIG. 7, it is judged whether an operating input of the record key is accepted. When it is accepted, control enters the recording mode, outputting the start recording command signal. Then frame pulses are calculated while outputting zero data. When the counted value of the frame pulses reaches 108, the output of zero data is ceased. After that, by executing the fade-in processing on the musical information, the recording operation is started.

Similarly at the time of stop recording, as shown in FIG. 8, it is judged whether an operating input of the stop key is accepted. When it is accepted, the stop recording command signal is outputted. After executing the fade-out processing on the musical information, frame pulses are calculated while outputting zero data. When the counted value reaches 108, the output of zero data is ceased. After the recording mode is cancelled, the recording operation is over.

In the present embodiment, 108frames (17 ms) are preserved in the leading and ending part of the digital audio data, respectively, as the recording period of zero data. But it is also acceptable to record zero data for one round of a particular track or for the preset given period in the successive recording section in order to simplify the control program of the computer 17. In case a DRAW type optical disk that does not need repeated recording is used as a record medium, the zero data recording period may be provided either on the leading part or ending part of the digital audio data.

It should be noted that if zero data are added to the leading or ending part of the audio information by executing analog muting on the incoming audio signals, it is possible that a muting circuit should generate noises and that the quality of musical information would be deteriorated. Therefore, zero data are added by digital processing by the encoder 26 in the optical disk recording/reproducing device of the present invention.

In the above-described embodiment, it is also possible to supply the computer 17 with the outputs of the analog to digital (A/D) converter 25, detecting silent parts among each tune, for example, and writing tune numbers, ending time, etc. on the buffer memory 19 as the disk information to record them on the TOC section 6 of the opto-magnetic disk 1. This enables to realization of a structure that can further prevent abnormal sounds from occurring by detecting the successively recorded part during recording in the reproduction system, based on the information recorded on said TOC section 6 during reproduction.

Figure 9:
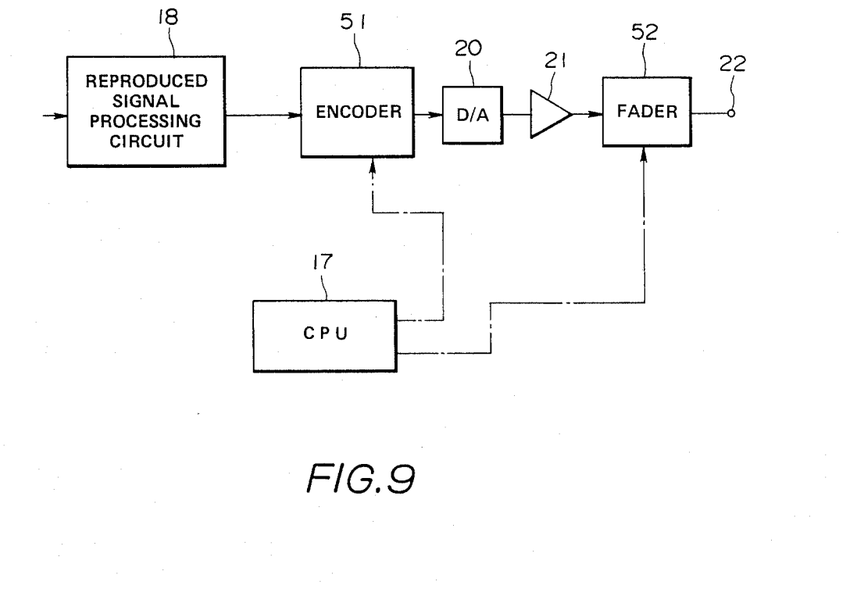
FIG. 9 is a block diagram showing a modification of a reproducing system in the embodiment of FIG. 3.

As is shown in FIG. 9, another encoder 51 and fader 52 are added to the circuit of the reproduction system. In the drawing, when the computer 17 detects the time of the successively recorded part during recording, the output data of the encoder 51 are controlled to be zero data for the prescribed period equivalent to one interleave length. Before and after this, the fader 52 is operated so as to output reproduced audio signals to which above-mentioned fade-out or fade-in processing is executed as shown in FIG. 6(b),(c).

Although the present invention has been shown and described with respect to preferred embodiments, various changes and modifications which are obvious to a person skilled in the art to which the invention pertains are deemed to lie within the spirit and scope of the invention.

What is claimed is:

1. An optical disk recording/reproducing device comprising:
    analog to digital converting means for digitizing incoming analog audio signals;
    encoding means for replacing digital audio data obtained as the converted output data due to the analog to digital converting means with zero data for a prescribed period by operating a record key;
    data processing means for forming recorded data by executing an interleave processing for error correction on the encoded output data due to the encoding means; and
    recording/reproducing means for recording the recorded data formed by the data processing means on a plurality of tracks of an optical disk and for reproducing the audio signals by optically reading the digital data recorded on the plurality of tracks of the optical disk,
    characterized in that the digital audio data are recorded on the optical disk by adding zero data to a leading part of them for a prescribed period to allow a noise-free interleave processing for error correction.

2. An optical disk recording/reproducing device comprising:
    analog to digital converting means for digitizing incoming analog audio signals;
    encoding means for replacing digital audio data obtained as the converted output data due to the analog to digital converting means with zero data for a prescribed period by operating a stop key;
    data processing means for forming recorded data by executing an interleave processing for error correction on the encoded output data due to the encoding means; and
    recording/reproducing means for recording the recorded data formed by the data processing means on a plurality of tracks of an optical disk and for reproducing the audio signals by optically reading the digital data recorded on the plurality of tracks of the optical disk,
    characterized in that the digital audio data are recorded on the optical disk by adding zero data to an ending part of them for a prescribed period to allow a noise-free interleave processing for error correction.

3. An optical disk recording/reprocuding device comprising:
    analog-digital converting means for digitizing incoming analog audio signals;
    encoding means for replacing digital audio data obtained as the converted outuput data due to the analog to digital converting means with zero data for a prescribed period by operating a record key and a stop key; data processing means for forming recorded data by executing an interleave processing for error correction on the encoded output data due to the encoding means; and recording/reproducing means for recording the recorded data formed by the data processing means on a plurality of tracks of an optical disk and for reproducing the audio signals by optically reading the digital data recorded on the plurality of tracks of the optical disk, characterized in that the digital audio data are recorded on the optical disk by adding zero data to leading and ending part of them for a prescribed period to allow a noise-free interleave processing for error correction.

4. An optical disk recording/reproducing device according to any one of claims 1 to 3, characterized in that said encoding means replaces said digital audio data with zero data for a prescribed period that is longer than a period equivalent to the interleave length of an interleave processing for error correction executed by said data processing means.

5. An optical disk recording/reproducing device according to any one of claims 1 to 3, characterized in that there is provided fading means for executing fade-in and fade-out processing on incoming analog audio signals.

6. An optical disk recording/reproducing device according to claim 4, characterized in that there is provided a frame counter for calculating a period corresponding to said interleave length by calculating frame pulses that indicate one frame period of the digital audio data so as to perform an operation control of said encoding means with the calculated output of the frame counter.

* * * * *